United States Patent
Mueller et al.

(10) Patent No.: US 8,675,464 B2
(45) Date of Patent: Mar. 18, 2014

(54) DUAL SIDED OPTICAL STORAGE MEDIA AND METHOD FOR MAKING SAME

(75) Inventors: William R. Mueller, Brentwood, TN (US); Ed Pickutoski, Blakely, PA (US)

(73) Assignee: Cinram Group, Inc., Phoenix, AZ (US)

( * ) Notice: Subject to any disclaimer, the term of this patent is extended or adjusted under 35 U.S.C. 154(b) by 711 days.

(21) Appl. No.: 12/896,344

(22) Filed: Oct. 1, 2010

(65) Prior Publication Data

US 2011/0019527 A1 Jan. 27, 2011

Related U.S. Application Data

(63) Continuation-in-part of application No. 12/696,878, filed on Jan. 29, 2010, now Pat. No. 7,986,601, which is a continuation of application No. 11/284,687, filed on Nov. 22, 2005, now Pat. No. 7,684,309, application No. 12/896,344, which is a continuation-in-part of application No. 11/726,968, filed on Mar. 22, 2007, now Pat. No. 7,986,611.

(60) Provisional application No. 60/733,598, filed on Nov. 3, 2005, provisional application No. 61/249,949, filed on Oct. 8, 2009.

(51) Int. Cl.
*G11B 7/26* (2006.01)
*C23C 14/34* (2006.01)

(52) U.S. Cl.
USPC .......................................... 369/94; 369/275.2

(58) Field of Classification Search
USPC ........ 369/94, 275.1–275.4; 427/162; 264/1.7; 204/192.1
See application file for complete search history.

(56) References Cited

U.S. PATENT DOCUMENTS

| | | | |
|---|---|---|---|
| 4,995,799 A | 2/1991 | Hayashi et al. |
| 5,073,037 A | 12/1991 | Fujikawa et al. |
| 5,181,081 A | 1/1993 | Suhan |
| 5,247,494 A | 9/1993 | Ohno et al. |
| 5,303,224 A | 4/1994 | Chikuma et al. |
| 5,315,107 A | 5/1994 | Smith et al. |
| 5,457,746 A | 10/1995 | Dolphin |
| 5,540,966 A | 7/1996 | Hintz |
| 5,549,444 A | 8/1996 | Dubuit |
| 5,766,495 A | 6/1998 | Parette |
| 5,792,538 A | 8/1998 | Yurescko-Suhan |
| 5,800,687 A | 9/1998 | Kempf |
| 5,801,464 A | 9/1998 | Brezoczky |
| 5,815,333 A | 9/1998 | Yamamoto et al. |
| 5,863,328 A | 1/1999 | Sichmann et al. |
| 5,863,399 A | 1/1999 | Sichmann |
| 5,900,098 A | 5/1999 | Mueller et al. |
| 5,905,798 A | 5/1999 | Nerlikar et al. |
| 5,913,653 A | 6/1999 | Kempf |

(Continued)

OTHER PUBLICATIONS

White Paper Blu-Ray Disc, 1.C Physical Format Specifications for BD-ROM, 3rd Edition, May 2005.

(Continued)

*Primary Examiner* — Andrew Sasinowski
(74) *Attorney, Agent, or Firm* — Cooper & Dunham LLP

(57) ABSTRACT

A dual sided optical storage medium which comprises a substrate disk having a first information layer readable from one side of the medium through the substrate disk and one or more information layers formed on the non-read side of the first information layer and configured to be read from the other side of the medium.

14 Claims, 8 Drawing Sheets

(56) References Cited

U.S. PATENT DOCUMENTS

| | | |
|---|---|---|
| 5,923,640 A | 7/1999 | Takemura et al. |
| 5,932,042 A | 8/1999 | Gensel et al. |
| 5,932,051 A | 8/1999 | Mueller et al. |
| 5,932,058 A | 8/1999 | Mueller |
| 5,935,673 A | 8/1999 | Mueller |
| 5,946,216 A | 8/1999 | Hollerich |
| 5,949,752 A | 9/1999 | Glynn et al. |
| 5,958,651 A | 9/1999 | Van Hoof et al. |
| 5,991,798 A | 11/1999 | Ozaki et al. |
| 5,995,481 A | 11/1999 | Mecca |
| 5,997,976 A | 12/1999 | Mueller et al. |
| 6,031,808 A | 2/2000 | Ueno |
| 6,035,329 A | 3/2000 | Mages et al. |
| 6,047,292 A | 4/2000 | Kelly et al. |
| 6,111,847 A | 8/2000 | Assadian |
| 6,117,284 A | 9/2000 | Mueller |
| 6,124,011 A | 9/2000 | Kern |
| 6,136,133 A | 10/2000 | Maruyama et al. |
| 6,151,189 A | 11/2000 | Brooks |
| 6,160,787 A | 12/2000 | Marquardt, Jr. et al. |
| 6,195,693 B1 | 2/2001 | Berry et al. |
| 6,212,158 B1 | 4/2001 | Ha et al. |
| 6,261,403 B1 | 7/2001 | Gerigk et al. |
| 6,309,496 B1 | 10/2001 | Van Hoof |
| 6,309,727 B1 | 10/2001 | Mueller et al. |
| 6,317,407 B1 | 11/2001 | Takemura et al. |
| 6,317,779 B1 | 11/2001 | Gile et al. |
| 6,321,649 B1 | 11/2001 | Vangen et al. |
| 6,341,375 B1 | 1/2002 | Watkins |
| 6,343,060 B1 * | 1/2002 | Ko ............................. 369/275.1 |
| 6,361,845 B1 | 3/2002 | Kern |
| 6,368,435 B1 | 4/2002 | Kempf |
| 6,396,798 B1 | 5/2002 | Takemura et al. |
| 6,416,609 B1 | 7/2002 | Imada et al. |
| 6,418,111 B1 | 7/2002 | Takemura et al. |
| 6,438,232 B1 | 8/2002 | Mages et al. |
| 6,440,248 B1 | 8/2002 | Mueller |
| 6,480,462 B2 | 11/2002 | Ha et al. |
| 6,500,297 B1 | 12/2002 | Paulus et al. |
| 6,527,538 B1 | 3/2003 | Pickutoski et al. |
| 6,537,423 B1 | 3/2003 | Ebisawa et al. |
| 6,564,255 B1 | 5/2003 | Mobini et al. |
| 6,580,683 B1 | 6/2003 | Braitberg et al. |
| 6,587,424 B2 | 7/2003 | Kuroda et al. |
| 6,628,603 B1 | 9/2003 | Kam et al. |
| 6,636,462 B1 | 10/2003 | Drynkin et al. |
| 6,678,237 B1 | 1/2004 | Edwards et al. |
| 6,725,258 B1 | 4/2004 | Bick et al. |
| 6,726,973 B2 | 4/2004 | Mueller |
| 6,814,825 B2 | 11/2004 | Becker et al. |
| 6,820,325 B2 | 11/2004 | Gieskes et al. |
| 6,896,829 B2 | 5/2005 | Kern et al. |
| 7,092,320 B1 | 8/2006 | Lee et al. |
| 7,325,287 B2 | 2/2008 | Sweeney |
| 7,419,045 B2 | 9/2008 | Kelsch |
| 7,535,806 B2 | 5/2009 | Fumanti |
| 7,564,771 B2 | 7/2009 | Sweeney |
| 7,578,389 B1 | 8/2009 | Haas |
| 7,637,713 B1 | 12/2009 | Parette |
| 7,684,309 B2 | 3/2010 | Mueller |
| 7,906,194 B2 | 3/2011 | Pickutoski et al. |
| 7,910,191 B1 | 3/2011 | Mueller et al. |
| 2001/0042111 A1 | 11/2001 | Douzono |
| 2002/0009022 A1 | 1/2002 | Britz et al. |
| 2002/0071382 A1 | 6/2002 | Netsu et al. |
| 2003/0002400 A1 | 1/2003 | Klein |
| 2003/0152019 A1 | 8/2003 | Thompson et al. |
| 2003/0229679 A1 | 12/2003 | Yoo et al. |
| 2004/0002018 A1 | 1/2004 | Oishi et al. |
| 2004/0008612 A1 | 1/2004 | Tsujita et al. |
| 2004/0044900 A1 | 3/2004 | Wang et al. |
| 2004/0052203 A1 | 3/2004 | Brollier |
| 2004/0134603 A1 | 7/2004 | Kobayashi et al. |
| 2004/0184390 A1 | 9/2004 | Oishi |
| 2004/0202097 A1 | 10/2004 | Oyake et al. |
| 2004/0213116 A1 | 10/2004 | Arai |
| 2004/0218511 A1 | 11/2004 | Kondo et al. |
| 2004/0257929 A1 | 12/2004 | Suzuki |
| 2004/0264361 A1 | 12/2004 | Kondo |
| 2005/0007944 A1 * | 1/2005 | Uchiyama et al. ......... 369/275.5 |
| 2005/0024993 A1 | 2/2005 | Kurita et al. |
| 2005/0031778 A1 | 2/2005 | Inoue |
| 2005/0036423 A1 | 2/2005 | Ichimura et al. |
| 2005/0039675 A1 | 2/2005 | Kang et al. |
| 2005/0042371 A1 | 2/2005 | Ushida et al. |
| 2005/0048250 A1 | 3/2005 | Yamaga et al. |
| 2005/0052985 A1 | 3/2005 | Senshu et al. |
| 2005/0053728 A1 | 3/2005 | Komaki |
| 2005/0053752 A1 | 3/2005 | Komaki |
| 2005/0072336 A1 | 4/2005 | Itoh et al. |
| 2005/0072518 A1 | 4/2005 | Komaki et al. |
| 2005/0109454 A1 | 5/2005 | Katoh et al. |
| 2005/0112319 A1 | 5/2005 | Itoh et al. |
| 2005/0132395 A1 | 6/2005 | Hisada et al. |
| 2005/0147809 A1 | 7/2005 | Hongo et al. |
| 2005/0158504 A1 | 7/2005 | Itoh et al. |
| 2005/0163024 A1 * | 7/2005 | Sato et al. .................. 369/275.1 |
| 2005/0170132 A1 | 8/2005 | Nee |
| 2005/0175771 A1 | 8/2005 | Hisada |
| 2005/0207331 A1 * | 9/2005 | Shinkai et al. ................ 369/288 |
| 2005/0219988 A1 * | 10/2005 | Atarashi et al. .......... 369/112.08 |
| 2005/0219991 A1 | 10/2005 | Van Den Oetelaar et al. |
| 2005/0243699 A1 * | 11/2005 | Noda et al. ................. 369/275.4 |
| 2006/0023598 A1 | 2/2006 | Babinski et al. |
| 2006/0062131 A1 | 3/2006 | Nagata et al. |
| 2006/0072428 A1 | 4/2006 | Marshall et al. |
| 2006/0101634 A1 | 5/2006 | Sweeney |
| 2006/0104190 A1 | 5/2006 | Babinski |
| 2006/0165419 A1 | 7/2006 | Musto |
| 2006/0179448 A1 | 8/2006 | Smith et al. |
| 2006/0181706 A1 | 8/2006 | Sweeney |
| 2006/0222808 A1 | 10/2006 | Pickutoski et al. |
| 2006/0270080 A1 | 11/2006 | Rinaldi |
| 2006/0274617 A1 | 12/2006 | Musto et al. |
| 2007/0008861 A1 | 1/2007 | Fumanti |
| 2007/0014224 A1 | 1/2007 | Sweeney |
| 2007/0029167 A1 | 2/2007 | Kelsch |
| 2007/0090006 A1 | 4/2007 | Kelsch |
| 2008/0223743 A1 | 9/2008 | Lenkeit |
| 2009/0127142 A1 | 5/2009 | Rothstein et al. |
| 2009/0262623 A1 | 10/2009 | LeBlanc et al. |
| 2010/0129586 A1 | 5/2010 | Mueller |
| 2011/0096655 A1 | 4/2011 | Mueller et al. |
| 2011/0171416 A1 | 7/2011 | Pickutoski et al. |

OTHER PUBLICATIONS

White Paper Blu-Ray Disc, 1.C Physical Format Specifications for BD-ROM, 4th Edition, Nov. 2005.
U.S. Appl. No. 11/715,249, filed Mar. 6, 2007 of William R. Mueller et al.
U.S. Appl. No. 11/726,968, filed Mar. 22, 2007 of Lewis Gensel et al.
U.S. Appl. No. 11/936,625, filed Nov. 7, 2007 of Petrus Hubertus Van Hoof et al.
U.S. Appl. No. 11/938,572, filed Nov. 12, 2007 of Dominick A. Dallaverde et al.
U.S. Appl. No. 12/126,667, filed May 23, 2008 of Ed Pickutoski.
U.S. Appl. No. 13/161,738, filed Jun. 16, 2011 of William R. Mueller.

* cited by examiner

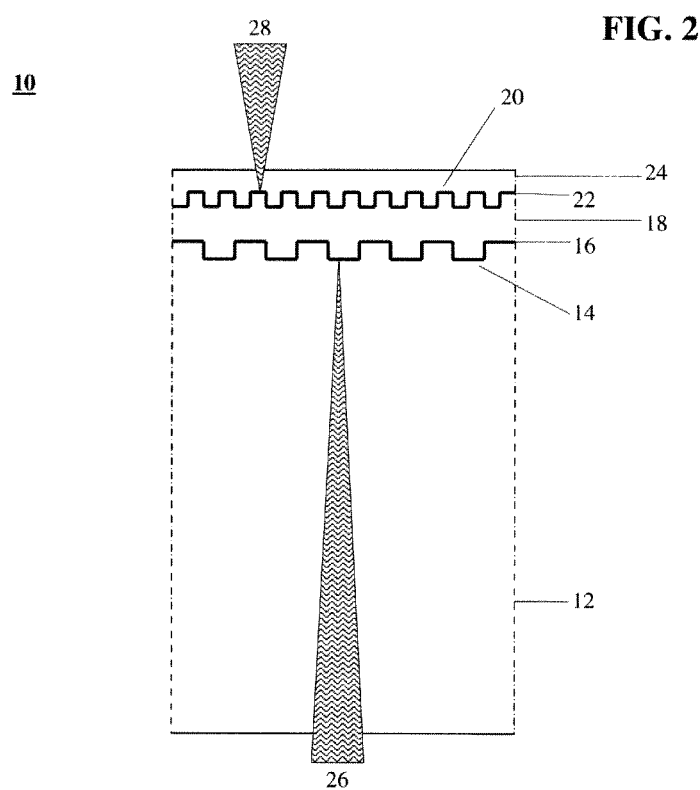

DUAL SIDED OPTICAL STORAGE MEDIA AND METHOD FOR MAKING SAME

CROSS-REFERENCE TO RELATED APPLICATIONS

This disclosure is a continuation-in-part of U.S. patent application Ser. No. 12/696,878, filed Jan. 29, 2010 which is a continuation of U.S. patent application Ser. No. 11/284,687, filed Nov. 22, 2005, which in turn claims the benefit of U.S. Provisional Application No. 60/733,598, filed Nov. 3, 2005. This disclosure is also a continuation-in-part of U.S. patent application Ser. No. 11/726,968, filed Mar. 22, 2007. In addition, this disclosure claims the benefit of U.S. Provisional Application No. 61/249,949, filed Oct. 8, 2009. The entire disclosure of each of the aforementioned applications is hereby incorporated by reference herein.

TECHNICAL FIELD

This disclosure relates to dual sided optical storage media, and more specifically an approach for manufacturing such a dual sided optical storage medium by adding one or more information layers, readable from one side of the medium, to an information layer bearing surface of a substrate disk (the information layer on or at such surface being readable from the other side of the medium, through the substrate disk).

DESCRIPTION OF RELATED ART

Use of optical storage media ("optical disks"), such as CDs (compact discs) and DVDs (digital versatile discs or digital video discs), for storing and transporting content (such as audio, video, graphics, computer software, etc.) in an optically readable manner has been popular for a number of years. Several formats of optical disks are currently available, including (A) read-only formats such as CD-DA (digital audio compact disc), CD-ROM (CD-read-only memory), DVD-ROM, and other formats wherein content is pre-recorded on the disk (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical disks. Optical disk players for these optical disks use a red laser (with a wavelength range of 635 nm to 660 nm in the case of DVD and a wavelength of approximately 780 nm in the case of CD).

Some exemplary optical disk manufacturing techniques (including methods, systems and apparatuses) are discussed in U.S. Pat. Nos. 5,181,081, 5,315,107, 5,766,495, 5,792,538, 5,900,098, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, 6,726,973, 6,896,829, 4,995,799, 5,766,359, 5,800,687, 5,863,328, 5,863,399, 5,913,653, 6,261,403, 6,368,435 and 6,814,825, which are incorporated by reference herein in their entireties in order to more fully describe the state of the art as of the date of the subject matter described and claimed herein.

Optical disks using a blue laser (with a wavelength range of 400 nm to 420 nm), such as Blu-ray Discs (BD) which includes read-only, recordable and rewritable formats have also been introduced. BD provides high density formats directed to demands for higher density and greater capacity of optical storage media.

BD format disks are typically manufactured by injection molding a 1.1 mm substrate bearing pits and sputtering a reflective film over the pits to form an information layer, and applying a transparent cover layer over the information layer.

There has also been proposed a dual layer BD disk, shown in FIG. 1A, having a first information layer formed in a side of a substrate disk and a second information layer applied to the read surface of the first information layer. However, both information layers are configured to be read from the same side with the same laser and both information layers conform to the same BD format specifications.

Further, there has been some demand for multi-format optical storage media. For example, Sanyo Corp of Japan has announced development of a BD/DVD disk wherein the DVD layer which resides a nominal 0.6 mm below the surface is read through the BD layer. This process and construction contains several significant issues. In order to read the DVD layer the BD layer must be coated with a special reflective film able to be reflective to the BD read laser and simultaneously be transparent to the DVD read laser. The optical properties including the clarity and birefringence of the BD disc substrate and the bonding adhesive for such a multi-format disc must be carefully (in comparison to a "BD only" disk) controlled in order to read the DVD layer. This requirement significantly reduces yield and increases cost. Since both information surfaces in this disk must be read from one side of the disk, the BD player must contain a more sophisticated method of interpreting which surface to play upon disc introduction.

Another example of multi-format optical storage media is BD/CD. Both CD structure and BD structure and functionality are widely understood. Both are nominally 120 mm diameter, 1.2 mm thick structures. Therefore, to simply join the two substrates together would create a composite structure of 2.4 mm thick which would exceed the specification limit of both disc formats.

In another proposal, shown in FIG. 1B, a baseboard having an information layer complying with a CD format is covered with a protective coating and is bonded to a baseboard having an information layer complying with the BD format and including another protective layer. However, the many layers and manufacturing steps required in this proposal increase the cost of manufacture and introduce additional sources of error in manufacturing the final disk.

There is a need for an improved approach for manufacturing dual sided optical storage media configured to be read from opposite sides, which approach can largely employ existing manufacturing facilities, with minimal alterations, while being reliable and not substantially increasing the costs of manufacturing.

SUMMARY

Various inventive aspects are discussed herein for manufacturing dual sided optical storage media wherein the dual sided medium includes one or more information layers readable from one side of the medium and an additional information layer readable from an opposite side of the medium, through the disk substrate.

In an aspect of this disclosure, the one or more information layers can be formed on the non-read side of the additional information layer by a process using a stamper to emboss a data pattern in an intermediate layer.

In another aspect, the one or more information layers are formed by a process using a transfer block on which a reflective layer is formed over a reverse data pattern and then bonding the reflective layer to the additional information layer with an intermediate layer before removing the transfer block.

In yet another aspect, an optical recording medium may comprise a substrate disk which includes a first data pattern embossed in one side that is configured to be read through the substrate disk. A first reflective layer may be formed over the first data pattern and an intermediate layer may be formed over the first reflective layer, opposite the substrate disk. A second data pattern may be embossed in the side of the intermediate layer facing away from the first reflective layer. A second reflective layer may be formed over the second data pattern and a cover layer may be formed over the second reflective layer, the second data pattern being configured to be read through the cover layer.

In still another aspect, a second data pattern may be formed in a second reflective layer and the second reflective layer may be disposed on the first intermediate layer opposite the first reflective layer, the second data pattern being configured to be read through the cover layer.

In another aspect, a method for manufacturing an optical storage medium includes forming a substrate disk including a first data pattern embossed in a side of the substrate disk and applying a first reflective layer over the first data pattern, the first data pattern being configured to be read through the substrate disk. An unhardened resin material may be applied to the first reflective layer opposite the substrate disk and the unhardened resin material may be contacted with a reverse second data pattern of a stamper. The resin material may be hardened about the reverse second data pattern to form a second data pattern in an intermediate layer. A second reflective material may be applied to the second data pattern and a cover layer may be formed over the second reflective layer, the second data pattern being configured to be read through the cover layer.

In another aspect, a method for manufacturing an optical storage medium includes applying a second reflective layer over a reverse second data pattern of a transfer block and the unhardened resin material may be contacted with the second reflective layer and hardened while maintaining contact to form an intermediate layer. The transfer block may be separated from the second reflective layer to expose the second data pattern formed in the second reflective layer.

BRIEF DESCRIPTION OF THE DRAWINGS

The features of the present application can be more readily understood from the following detailed description with reference to the accompanying drawings wherein:

FIG. 2 shows a partial cross-sectional view of a portion of a dual sided optical storage medium, according to an exemplary embodiment of the present disclosure;

DETAILED DESCRIPTION

Figure 1A:
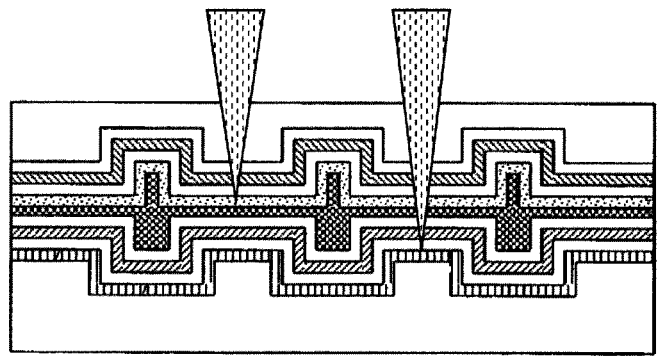
FIG. 1A and FIG. 1B show partial cross sectional views of prior art disks.
Figure 1B:
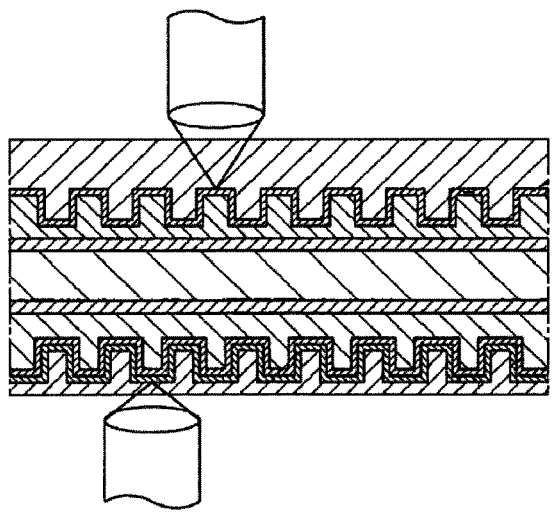

This patent specification describes methodologies for manufacturing dual sided optical storage media wherein each storage medium can include one or more high-density information layers and an additional information layer, with minimal modification of existing optical disc manufacturing equipment. In such a dual sided optical storage medium, a substrate disk is formed with an information layer consisting of an embossed data pattern and a reflective layer formed over the data pattern and configured to be read through the substrate disk. An intermediate layer is then formed over the reflective layer on the substrate disk, a high-density data pattern is embossed in the intermediate layer, a second reflective layer is formed over the high-density data pattern and configured to be read from a direction opposite the substrate disk. A cover layer is then formed over the reflective layer to form the dual sided optical storage medium.

The term "substrate disk" is used generally in this disclosure to refer to a molded disk (formed from materials such as polycarbonate resins, acrylic resins, polyolefine resins, another plastic material, glass, ceramics, and the like). The disk may be molded in an injection molding process using a thermoplastic resin or may be molded and hardened using a catalyst such as air, radiation, heat or a chemical catalyst. An information layer of a substrate disk may not be readable on its own in a standards-compliant optical disc player or drive without the addition of one or more layers on the information layer side of the substrate disk.

The term "high-density" is used generally in this disclosure to refer to an information layer, or a storage medium including at least one information layer, having information capacity of 15 GB or greater. For example, BD format information layers generally can have an information capacity of 15 GB or greater. On the other hand, this disclosure may be applied to optical disks having 80 mm diameter, wherein each information layer would have a capacity of 7.5 GB or greater.

The term "dual-sided" is used generally in this disclosure to refer to optical discs with two opposite facing readout direction, such that one or more corresponding information layers can be read from one readout direction, and one or more other information layers can be read from the other readout direction. This is to be distinguished from a "single-sided" optical disc in which all information on the disc must be read through the same surface of the disc.

In read-only type optical disks (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, generally spaced radially from the center hub in a spiral track originating at the medium center hub and ending toward the medium's outer rim. The light reflected from a read-only medium's surface by an optical disk player or reader varies according to the presence or absence of pits along the information track. A photodetector and other electronics inside the optical disk player translate the signal from the transition points between these pits and lands into a digital signal of 0s and 1s representing the stored information.

Read-only type optical disks generally are produced by an injection molding process. For example, data representing the content to be recorded, encoded as a run length limited digital code (such as commonly known as an EFM signal in Co manufacturing) which contains its digital information in the timing between transitions, is used in a mastering process to control a laser beam recorder to form pits in a photoresist or a dye-polymer layer on an optical grade glass disk known as a glass master. A metallized glass master is used in an electroforming process to form (typically, metal) stampers. A stamper is used on one side of an injection molding cavity to emboss a layer of pits and lands on a transparent polymer substrate formed by injection molding. The information bearing surface of the substrate is then covered with a reflective film (of metal or alloy) or the like, to form an information layer. In the case of a CD, a plastic protective coating is applied over the reflective film, and then art (for example, a picture, design, text, etc.) is typically printed on the upper surface of the disk (that is, on the side of the substrate which bears the information layer), to form an end product which is approximately 1.2 mm thick. In the case of DVDs, two half-thickness substrates (that is, approximately 0.6 mm each) are typically formed, metallization is applied to one (for example, DVD-5) or both (for example, DVD-10, DVD-9, DVD-18) half-thickness substrates, and the two half-thickness substrates are bonded by an adhesive (for example, hot-melt adhesive, ultraviolet light-cured adhesive, etc.), with the information layer being shielded from the external environment by the half-thickness substrates as cover layers. A second information layer can be formed in each half-thickness substrate (for example, DVD-18) by applying a photo-polymer coating over a metallization layer applied to a half-thickness substrate (prior to bonding) and the second information layer is embossed by a stamper into the photo-polymer layer which is then UV cured, metallized and protective coated. Thus, the information layers in such DVD disks are typically in the middle of the disk, sandwiched between half-thickness substrates.

Recordable type optical media typically include a spiral wobble groove in the substrate. The groove defines recording channels on the disc for recording data, provides information for tracking of the disk while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include at least a recording layer, and in addition a reflective layer (of metal or alloy) and a protective layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to form irreversibly a pattern of marks or pits in the recording layer.

Each recording side of a rewritable disk also uses multiple layers beginning with a polycarbonate plastic substrate containing a shallow spiral groove extending from the inside to the outside diameter of the disc. A DVD-RW disk may additionally include pits and lands and a DVD-RAM disk also inside the groove itself. The substrates (including information layer bearing the spiral groove, land pre-pits and embossed areas) may be formed by injection molding, using a stamper electroformed with a glass master. Next in the multiple layers of a rewritable disk typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer in single-sided optical media. During recording of the rewritable optical medium, the laser selectively heats tiny areas of the recording track to change the phase of each heated area from more crystalline into less crystalline (also known as "amorphous") phase, in order to create marks that can be called "pits" (the term "pit" is used broadly herein to cover, for example, a pit in a read-only type optical disk, and a pit or mark in a recordable or rewritable optical disk). During erase, the laser (in a process called "annealing") changes the amorphous areas back into more crystalline areas.

The various aspects of this disclosure may be adapted for use in manufacturing of read-only type optical media, recordable optical media, rewriteable optical media, hybrid media, etc.

Some aspects of this disclosure will be explained below by way of examples involving a BD/CD dual sided optical storage medium. However, it should be appreciated that this disclosure is not limited to such examples, and that the various aspects of this disclosure can be applied broadly for other mixed format and/or dual sided media.

In the embodiment shown in FIG. 2, a dual sided optical storage medium 10 comprises a substrate disk 12, a first data pattern 14, a first reflective layer 16 over the first data pattern 14, an intermediate layer 18 over the first reflective layer 16, a second data pattern 20, a second reflective layer 22 over the second data pattern 20, and a cover layer 24 over the second reflective layer 22. The first information layer comprised of the first data pattern 14 and the first reflective layer 16 can be read through the substrate disk 12 using a first light source 26 (illustrated with the lower triangular-shaped laser beam), such as from a laser having a wavelength of about 780 nm+/−10 nm, which light is reflected (at least partially) from the first reflective layer 16. The second information layer comprised of the second data pattern 20 and second reflective layer 22 can be read from the direction opposite the substrate disk 12 using a second light source 28 (illustrated with the upper triangular-shaped laser beam), such as from a blue laser having a wavelength of about 405 nm+/−5 nm, which light is reflected (at least partially) from the second reflective layer 22.

It should be appreciated that the drawings are not drawn to scale. For example, the incident beams from light sources 26 and 28 appear to come to a point on the respective reflective layers, while in reality, the location of incidence on the reflective layers is wider than a point.

In an example in which the reflective layer 16 and data pattern 14 correspond to a CD information surface and the data pattern 20 and reflective layer 22 correspond to a BD information surface, such CD information surface resides approximately 1.1 mm through the disk substrate 12, and the BD information surface resides approximately 0.1 mm through the cover layer 24 then a possible configuration is a dual sided structure where, for example, the BD information surface resides 0.1 mm below the top surface relative to a BD reading device positioned above the structure, and the CD information resides 1.1 mm above the bottom surface relative to a CD reading device positioned below the structure.

Figure 3:
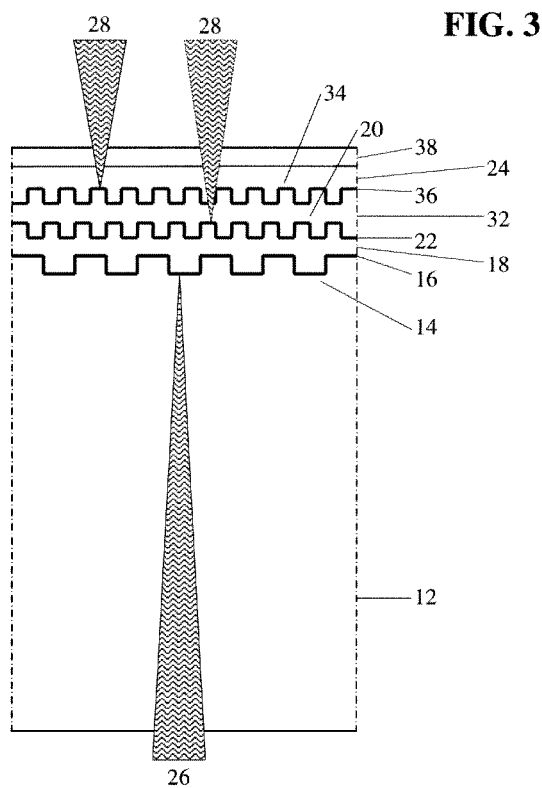
FIG. 3 shows a similar partial cross-sectional view of a portion of another dual sided optical storage medium, according to another exemplary embodiment of the present disclosure.

In another example (FIG. 3), a second dual sided optical storage medium 30 may comprise the substrate disk 12, first data pattern 14, first reflective layer 16, intermediate layer 18, second data pattern, second reflective layer 22 and cover layer 24 of the dual sided optical storage medium 10 shown in FIG. 2 along with an additional second intermediate layer 32, third data pattern 34 and third reflective layer 36 interposed between the second reflective layer 22 and cover layer 24. The third information layer comprised of the third data pattern 34 and third reflective layer 36 can be read using the second laser 28 from the direction opposite the substrate disk 12. In the dual sided optical storage medium 30 shown in FIG. 3, the second information layer is read by the second laser 28 penetrating the third information layer and being reflected from the second reflective layer 22 back through the third information layer. Accordingly, reflectivity and transmissivity of the third reflective layer 36 for the wavelength of the second laser 28 must be strictly controlled.

The substrate disk 12 preferably has a thickness in a range of about 1.1 mm to 1.3 mm and more preferably about 1.1 mm. The intermediate layer 18 preferably has a thickness of about 20 μm. In the dual sided optical storage medium 10 shown in FIG. 2, the cover layer 24 preferably has a thickness of about 100 μm+/−3 μm. In the dual sided optical storage medium 30 shown in FIG. 3, the cover layer 24 preferably has a thickness of about 75 μm+/−3 μm and the second intermediate layer preferably has a thickness of about 25 μm+/−5 μm.

The data patterns 14, 20 and 34 can be configured to include a series of pits in a plane of land, all of which being covered by respective reflecting layers 16, 22 and 36 comprised of a reflective film material. The reflective film material can be comprised of a metal or metal-alloy (for example, silver, gold, silicon, aluminum, or an alloy). The reflective film material may be different for each reflective layer or may be similar for two or more reflective layers.

In one example, the second and third data patterns 20 and 34 comprise information tracks having pits with a minimum length along the track in a range of 138 nm to 160 nm. The second and third data patterns 20 and 34 can be configured to comprise information marks configured for reading using a laser with a wavelength in a range of 400 nm to 410 nm and a numerical aperture of 0.85. The second and third data patterns 20 and 34 with such configurations can each have an information capacity of 23 GB or more.

The cover layer 24 is made of a light transmissive or transparent material (for example, radiation curable resin), and may be formed by utilizing any of various methodologies. For example, the light transmitting cover layer may be formed by a spin coating technique. See for example, U.S. Patent Application Publication No US2005/0109454A1 (the entire contents of which are incorporated by reference herein).

The dual sided optical storage media 10 and 30 may each further be provided with an optional hard coat layer 34 formed over the exposed outer surface of the cover layer 24. The hard coat layer 38 which has properties of scratch resistance and abrasion resistance is preferably formed over cover layer 24. Hard coat layer 38 may be formed by applying a hard coat agent composition (for example, UV hardening resin) on cover layer 24, followed by curing through irradiation with active energy rays such as ultraviolet rays, electron rays or visible rays. Examples of a hard coat composition and techniques for applying the composition are described in U.S. Patent Application Publication Nos. US2005/0072336A1, US2005/0112319A1 and US 2005/0158504A1, the entire disclosures of which are incorporated by reference herein. In another example, a hard coat film including the cover layer and the hard coat may be formed and then the hard coat film is bonded on the information layer. See, for example, U.S. Patent Application Publication No. US2005/0147809A1 (the entire contents of which are incorporated by reference herein).

The first information layer may be configured to conform to the CD format while the second and third information layers may be configured to conform to the BD format. Additionally, the first, second, or third data pattern, or any combination thereof, may comprise read-only data patterns comprised of pits embossed in a plane of lands. Alternatively, the first, second, or third data pattern, or any combination thereof may comprise write once or rewriteable data patterns such as wobble grooves and the like which are well known in the art.

In another configuration, a data security scheme applied to the data pattern of one of the information layers may be different from a data security scheme applied to another data pattern of another information layer. In a similar fashion, a data pattern of one information layer may have a data security scheme applied to it while another of the information layers has no data security scheme applied to it.

Figure 4:
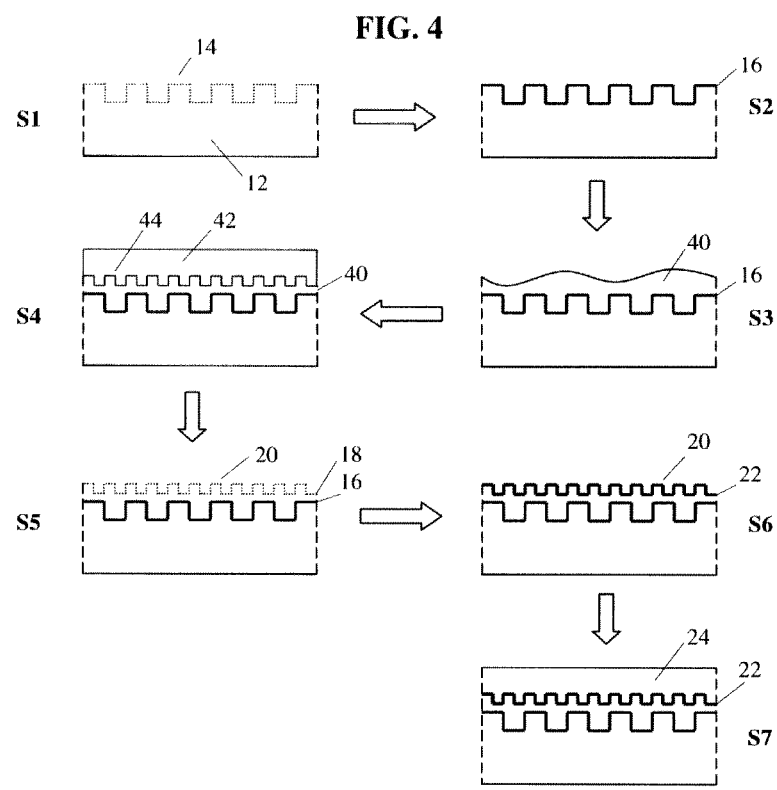
FIG. 4 graphically illustrates an example of a process for manufacturing a dual sided optical storage medium, according to another exemplary embodiment of the present disclosure.

A method, according to one exemplary embodiment, for making a dual sided optical storage medium is shown graphically in FIG. 4. The method illustrated in FIG. 4 includes forming S1 a substrate disk 12 including a first data pattern 14 embossed in major side of the substrate disk 12. The substrate disk 12 may be formed by molding in an injection molding process using a thermoplastic resin or may be molded and hardened using a hardening catalyst such radiation. A substrate stamper may be formed according to methods well known in the art, the substrate stamper comprising a reverse first data pattern corresponding to the first data pattern 14. The substrate stamper is used in a molding process to emboss the first data pattern in the substrate disk.

A first reflective layer 16 is then formed S2 over the first data pattern 14 to form the first information layer. The reflective layer 16 may be applied using a method such as sputtering. A hardenable resin material 40 is then applied 53 to the first reflective layer 16 in an unhardened state. The hardenable resin material 40 may be selected from a group of materials including materials hardenable using a catalyst such as radiation, heat, light, or chemicals. A first stamper 42 comprising a reverse second data pattern 44 is then brought into contact 54 with the unhardened resin material 40 and the resin material 40 is hardened about the reverse second data pattern 44. The resin material 40 may be configured to be hardened by, for example, exposing the resin material 40 to radiation. When the resin material 40 is hardened, the first stamper 42, being formed of a material that does not adhere well to the resin material 40, is separated S5 from the resin material 40, thereby revealing the first intermediate layer 18 formed of the hardened resin material and the second data pattern 20 in the surface of the first intermediate layer 18 facing away from the first reflective layer 16.

A second reflective layer 22 is then formed over the second data pattern 20. The second reflective layer 22 may be formed of a reflective material different than the material used to form the first reflective layer or may be similar to the reflective material of the first reflective layer 16. The second reflective layer 2 may be formed using a process similar to the one used to form the first reflective layer 16 or using a different process. The second reflective layer 22 is configured to be read from a direct on opposite the substrate disk 12.

Over the second reflective layer 22, either a cover layer 24 or a second intermediate layer 32, third data pattern 34 and third reflective layer 36 are formed. In the case that a cover layer 24 is formed S7 over the second reflective layer 22, a cover layer material is deposited over the second reflective layer 24 and hardened. Alternatively, a cover layer material may be adhered to the second reflective layer 22. A hard coat layer 38 may be applied over the cover layer 24.

In the case that a second intermediate layer 32, third data pattern 34, and third reflective layer 36 are formed over the second reflective layer 22, the second intermediate layer 32 may be formed using a second stamper in the manner described above for the first stamper 42, or alternatively, using the method described below for the first transfer block 48. A second hardenable resin material used in the second intermediate layer 32 may be similar to the resin material 40 used for the first intermediate layer 18 or may be different. A cover layer 24 is then formed over the third reflective layer 36. A hard coat layer 38 may be applied over the cover layer 24.

Figure 5:
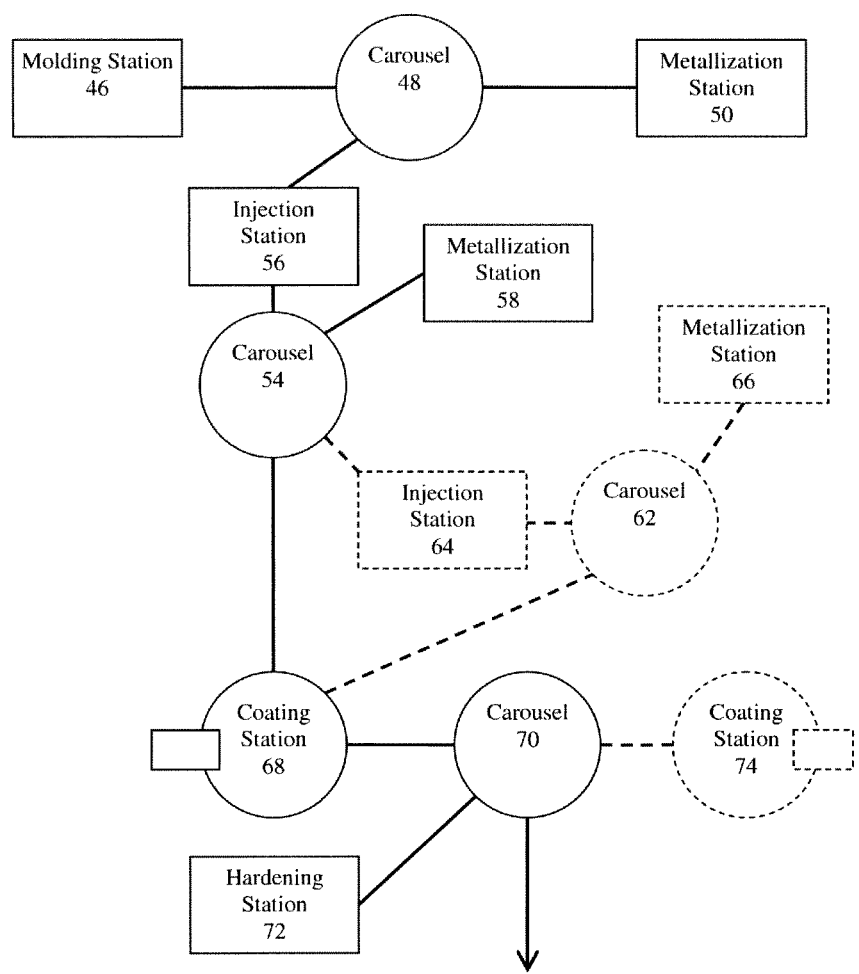
FIG. 5 graphically illustrates an example of a dual sided optical storage medium manufacturing apparatus, according to another exemplary embodiment of the present disclosure.

An example of a dual sided optical storage medium manufacturing apparatus implementing the method described above with respect to FIG. 4 is illustrated in FIG. 5. In the apparatus illustrated in FIG. 5, the substrate disk 12 is molded at the molding station 46 and transferred by the carousel 48 to the metallization station 50 where the first reflective layer 16 is formed over the first data pattern 14 of the substrate disk 12. After formation of the first reflective layer 16, the carousel 48 transfers the substrate disk 12 from the metallization station 50 to the injection station 56 where the resin material 40 is applied (for example, by spin-coating) to the first reflective layer 16 before introduction into a mold or embossing apparatus which includes the first stamper 42. The resin material 40 is then hardened and the first stamper 42 is separated from the resin material 40 to reveal the first intermediate layer 18 and the second data pattern 20 corresponding to the reverse second data pattern 44 of the first stamper 42. Carousel 54 then transfers the substrate disk 12 having the first reflective layer 16 and first intermediate layer 18 formed thereon to the metallization station 58 where the second reflective layer 22 is formed over the first intermediate layer 18.

If the dual sided optical storage medium is to have a third information layer added thereto, the substrate disk 12 and added layers are transferred by the carousel 54 to the injection station 64 where hardenable resin material is applied to the second reflective layer 22 in a mold which includes the second stamper. The resin is hardened to form the second intermediate layer 32 and the second stamper is separated from the hardened resin material to reveal second intermediate layer 32 including the third data pattern 34 corresponding to the reverse third data pattern of the second stamper. The carousel 62 then transfers the substrate disk 12 and added layers to the metallization station 66 where the third reflective layer 36 is formed over the third data pattern 34 of the second intermediate layer 32. Further, it should be appreciated that any number of additional information layers may be added to the optical storage medium on top of the third reflective layer 36 using the techniques described herein. For example, it has been demonstrated in a laboratory setting that eight high-density information layers may be included in an optical disk.

The substrate disk 12 is then transferred by the carousel 62 to the coating station 68 where cover layer material is applied to the third reflective layer 36 (or outermost reflective layer if there are more than three). The carousel 70 then transfers the substrate disk 12 to the hardening station 72 where the cover layer material is hardened to form the cover layer 24. If a hard coat 38 is required, the substrate disk 12 and added layers are transferred by the carousel 70 to the coating station 74 where the hard coat layer 38 is applied. The dual sided optical storage medium is then transferred by carousel 70 out of the apparatus for, for example, further finishing and/or packaging operations.

If the dual sided optical storage medium is not required to have a third information layer added thereto, the substrate disk 12 and added layers are transferred by carousel 54 from the metallization station 58 to the coating station 68. The cover layer 24 and optional hard coat layer 38 are applied as described above.

In describing the apparatus illustrated in FIG. 5, it will be appreciated that the operations performed by the various coating stations, metallization stations, carousels, injection stations, etc., may be consolidated into a lesser number of similar devices or divided into a greater number of devices. For example, the operations performed by carousel 48 and carousel 54 as they are illustrated in FIG. 5 may be performed by the same carousel device in an equivalent apparatus.

Figure 6:
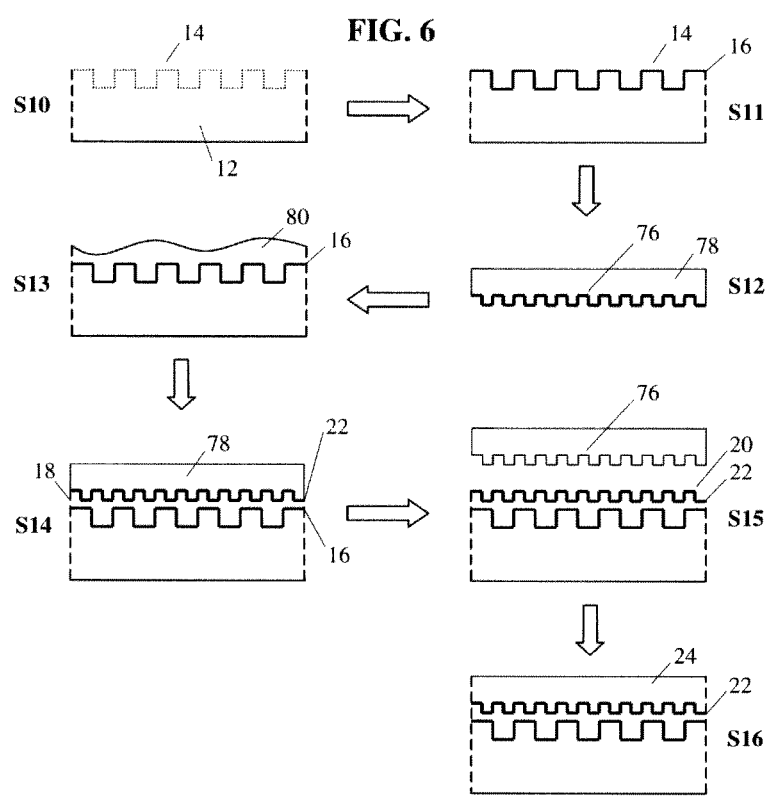
FIG. 6 graphically illustrates another example of a process for manufacturing another dual sided optical storage medium, according to another exemplary embodiment of the present disclosure.

Another method, according to another exemplary embodiment, for making a dual sided optical storage medium is shown graphically in FIG. 6. The method illustrated in FIG. 6 includes forming S10 a substrate disk 12 including a first data pattern 14 embossed in a major side thereof and forming S11 a first reflective layer 16 over the first data pattern 14 as in the method illustrated in FIG. 4.

A second reflective layer 22 is then formed S12 over a reverse second data pattern 76 of a first transfer block 78. The transfer block 78 is preferably formed of a material that does not bond well to the reflective material of the second reflective layer 22. An example of a material that does not generally bond well to reflective materials is polymethyl methacrylate (PMMA). An unhardened hardenable resin material 80 is then deposited S13 on the first reflective layer 16 and the second reflective layer 22 formed on the first transfer block 78 is brought into contact S14 with the resin material 80. The hardenable resin material 80 may be selected from a group of materials including materials hardenable using a catalyst such as radiation, heat, light, or chemicals. While maintaining contact with the second reflective layer 22, the resin material 80 is hardened, bonding the second reflective layer 22 to the first reflective layer 16 and forming the first intermediate layer 18. The first transfer block 78 is then separated S15 from the second reflective layer 22, revealing the second data pattern 20 corresponding to the reverse second data pattern 76 of the first transfer block 78.

Over the second reflective layer 22, either a cover layer 24 or a second intermediate layer 32, third data pattern 34 and third reflective layer 36 are formed. In the case that a cover layer 24 is formed S16 over the second reflective layer 22, a cover layer material is deposited over the second reflective layer 22 and hardened. Alternatively, a cover layer material may be adhered to the second reflective layer 22. A hard coat layer 38 may be applied over the cover layer 24.

In the case that a second intermediate layer 32, third data pattern 34 and third reflective layer 36 are formed over the second reflective layer 22, the second intermediate layer 32 and third reflective layer 36 may be formed using a second transfer block in the manner described above for the first transfer block 78, or alternatively, using the method described above for the first stamper 42. A second hardenable resin material used in the second intermediate layer 32 may be similar to the resin material 80 used for the first intermediate layer 18 or may be different. Similarly, any number of further information layers may be added to the optical storage medium on top of the third reflective layer 36 using any of the techniques described herein. A cover layer 24 is then formed over the third reflective layer 36 (or outermost reflective layer if there are more than three). A hard coat layer 38 may be applied over the cover layer 24.

Figure 7:
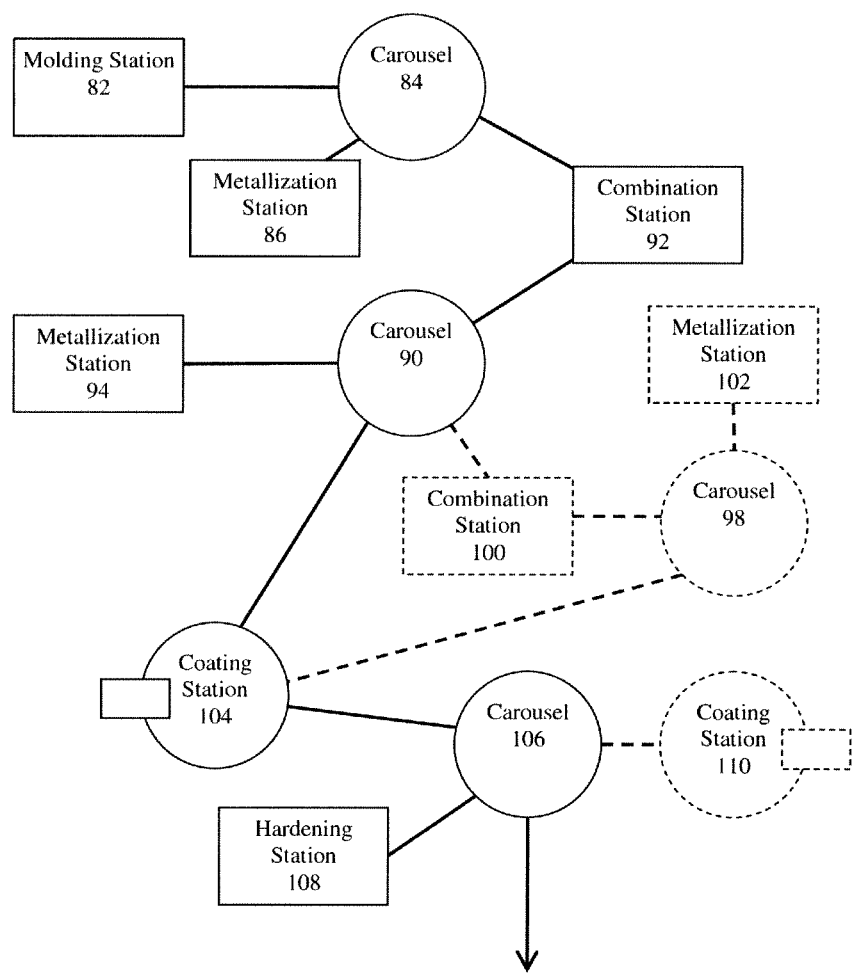
FIG. 7 graphically illustrates an example of a dual sided optical storage medium manufacturing apparatus, according to another exemplary embodiment of the present disclosure.

An example of a dual sided optical storage medium manufacturing apparatus implementing the method described above with respect to FIG. 6 is illustrated in FIG. 7. In the apparatus illustrated in FIG. 7, the substrate disk 12 is molded at the molding station 82 and transferred by the carousel 84 to the metallization station 86 where the first reflective layer 16 is formed over the first data pattern 14 of the substrate disk 12. After formation of the first reflective layer 16, the carousel 84 transfers the substrate disk 12 from the metallization station 86 to the combination station 92. Meanwhile, the second reflective layer 22 is formed over the reverse second data pattern 76 of the first transfer block 78 at the metallization station 94. The first transfer block 78 and second reflective layer 22 are then transferred by the carousel 90 to the combination station 92 where they are united with the substrate disk 12. A hardenable resin material 80 is applied between the second reflective layer 22 and the first reflective layer 16 in a mold which includes the disk substrate 12 and the first transfer block 78. The resin material 80 is then hardened to form the first intermediate layer 18 and the first transfer block 78 is separated from the second reflective layer 22 to reveal the second data pattern 20 corresponding to the reverse second data pattern 76 of the first transfer block 78.

If the dual sided optical storage medium is to have a third information layer added thereto, the substrate disk 12 and added layers are transferred by the carousel 90 to the combination station 100. Meanwhile, the third reflective layer 36 is formed over the reverse third data pattern of the second transfer block in the metallization station 102. The second transfer block is then transferred by the carousel 98 to the combination station 100 where it is united with the substrate disk 12. A second hardenable resin material is applied between the third reflective layer 36 and the second reflective layer 22 in a mold which includes the disk substrate 12 and the second transfer block. The second resin material is then hardened to form the second intermediate layer 32 and the second transfer block is separated from the third reflective layer 36 to reveal the third data pattern 34 corresponding to the reverse third data pattern of the second transfer block.

The substrate disk 12 is then transferred by the carousel 98 to the coating station 104 where cover layer material is applied to the third reflective layer 36. The carousel 106 then transfers the substrate disk 12 to the hardening station 108 where the cover layer material is hardened to form the cover layer 24. If a hard coat 38 is required, the substrate disk 12 and added layers are transferred by the carousel 106 to the coating station 110 where the hard coat layer 38 is applied. The dual sided optical storage medium is then transferred by carousel 106 out of the apparatus for, for example, further finishing and/or packaging operations.

If the dual sided optical storage medium is not required to have a third information layer added thereto, the substrate disk 12 and added layers are transferred by carousel 90 from the combination station 92 to the coating station 104. The cover layer 24 and optional hard coat layer 38 are applied as described above.

In describing the apparatus illustrated in FIG. 7, it will be appreciated that the operations performed by the various coating stations, metallization stations, carousels, combination stations, etc., may be consolidated into a lesser number of similar devices or may be divided into a greater number of devices.

Figure 8:
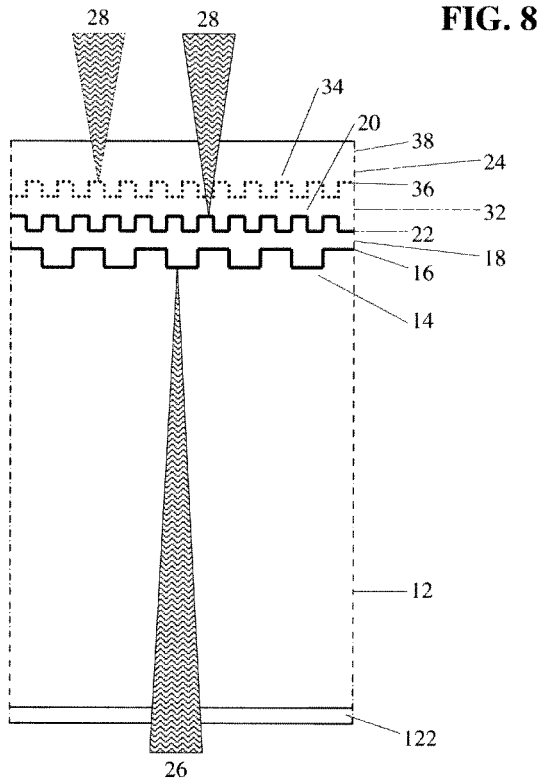
FIG. 8 shows a partial cross-sectional view of a portion of a dual sided optical storage medium, according to yet another exemplary embodiment of the present disclosure.

FIG. 8 shows a partial cross-sectional view of a portion of another exemplary embodiment of a dual sided optical storage medium 120 according to the present disclosure. The optical storage medium 120 includes a first data pattern 14, a second data pattern 20 and optionally a third data pattern 34 and respective reflective layers 16, 22 and 36. The optical storage medium 120 also includes a barrier layer 122 disposed on the side of the substrate disk 12 through which the first light source 26 travels to reach the first information layer. The barrier layer 122 is transmissive to at least the wavelength or wavelength range of the first light source 26 used to read and/or record data from/to the first information layer. The barrier layer 122 may be formed over the substrate disk 12 by, for example a sputtering process. The composition and/or method of application of the barrier layer 122 may be chosen to impart various advantageous properties to the optical storage medium 120, such as, for example, increased resistance to moisture absorption and/or scratch resistance.

Using various methodologies described herein, dual sided optical storage media can be manufactured at faster rates than when techniques proposed by others for manufacturing optical discs are applied. Also, manufacturing or reading the optical storage media manufactured utilizing the methodologies described herein does not have the additional complexities that are present in other proposed approaches.

In describing examples and exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

In addition, the embodiments and examples above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

Further, in the discussion above, read-only format information layers are posed as examples. It should be apparent after a reading of this patent disclosure, however, that the techniques of this disclosure apply similarly to recordable (write once read many times) and rewritable format information layers.

What is claimed is:

1. An optical storage medium comprising:
    a substrate disk having a first data pattern embossed in a major side thereof;
    a first reflective layer formed over the embossed substrate data pattern and configured to be read through the substrate disk;
    a first intermediate layer disposed on the first reflective layer opposite the substrate disk;
a second reflective layer disposed on the first intermediate layer opposite the first reflective layer, the second reflective layer having a second data pattern formed in a major surface thereof and being configured to be read from a direction opposite the substrate disk; and
    a cover layer formed over the second reflective layer opposite the first intermediate layer having an exposed outer surface opposite the second reflective layer, wherein
    the substrate disk has a thickness within a range of about 1.1 mm to 1.3 mm, the first intermediate layer has a thickness of about 20 μm, and the cover layer has a thickness within a range of 97 μm to 103 μm.

2. The optical storage medium of claim 1, wherein the first data pattern is readable by a laser having a wavelength within a range of 770 nm to 790 nm and the second data pattern is readable by a laser having a wavelength within a range of 400 nm to 410 nm.

3. The optical recording medium of claim 1, wherein at least one of the first data pattern and the second data pattern is configured to enable writing information to the optical recording medium.

4. The optical recording medium of claim 1, further comprising: a hard coat layer formed over the exposed outer surface of the cover layer, the hard coat layer having an exposed outer surface opposite the cover layer.

5. The optical recording medium of claim 1, further comprising: a barrier layer disposed over a second major side of the substrate disk opposite the embossed first data pattern.

6. An optical storage medium comprising:
  a substrate disk having a first data pattern embossed in a major side thereof;
  a first reflective layer formed over the embossed substrate data pattern and configured to be read through the substrate disk;
  a first intermediate layer disposed on the first reflective layer opposite the substrate disk;
  a second reflective layer disposed on the first intermediate layer opposite the first reflective layer, the second reflective layer having a second data pattern formed in a major surface thereof and being configured to be read from a direction opposite the substrate disk;
  a cover layer formed over the second reflective layer opposite the first intermediate layer having an exposed outer surface opposite the second reflective layer;
  a second intermediate layer formed over the second reflective layer opposite the first intermediate layer, the second intermediate layer including a third data pattern disposed on a major side of the second intermediate layer facing away from the second reflective layer; and
  a third reflective layer disposed on the second intermediate layer opposite the first reflective layer and being configured to be read from the direction opposite the substrate disk, wherein
  the cover layer is formed on the third reflective layer opposite the second intermediate layer and has an exposed outer surface opposite the third reflective layer.

7. The optical recording medium of claim 6, wherein the substrate disk has a thickness within a range of about 1.1 mm to 1.3 mm, the first intermediate layer has a thickness of about 20 μm, the second intermediate layer has a thickness within a range of 20 μm to 30 μm and the cover layer has a thickness within a range of 72 μm to 78 μm.

8. A method for manufacturing an optical storage medium comprising the steps of:
  forming a substrate disk including a first data pattern embossed in a major side thereof;
  applying a first reflective layer over the first data pattern, the first reflective layer being configured to be read through the substrate disk;
  applying an unhardened first resin material to the first reflective layer opposite the substrate disk;
  contacting the unburdened first resin material with a reverse second data pattern of a first stamper;
  hardening the first resin material about the reverse second data pattern to form a first intermediate layer including a second data pattern corresponding to the reverse second data pattern of the first stamper;
  applying a second reflective layer over the second data pattern, the second reflective layer being configured to be read from a direction opposite the substrate disk; and
  applying a cover layer over the second reflective layer opposite the first intermediate layer, the cover layer having an exposed outer surface opposite the second reflective layer,
  wherein the substrate disk has a thickness within a range of about 1.1 mm to 1.3 mm, the first intermediate layer has a thickness of about 20 μm, and the cover layer has a thickness within a range of 97 μm to 103 μm.

9. The method of claim 8, further comprising the step of:
  applying a hard coat layer over the exposed outer surface of the cover layer, the hard coat layer having an exposed outer surface opposite the cover layer.

10. The method of claim 8, wherein the first data pattern is readable by a laser having a wavelength within a range of 770 nm to 790 nm and the second data pattern is readable by a laser having a wavelength within a range of 400 nm to 410 mm.

11. The method of claim 8, wherein the substrate disk is formed by an injection molding process using a substrate stamper having a reverse first data pattern formed thereon corresponding to the first data pattern.

12. The method of claim 8, wherein the first reflective layer and second reflective layer are formed by a sputtering process.

13. A method for manufacturing an optical storage medium comprising the steps of:
  forming a substrate disk including a first data pattern embossed in a major side thereof;
  applying a first reflective layer over the first data pattern, the first reflective layer being configured to be read through the substrate disk;
  applying an unhardened first resin material to the first reflective layer opposite the substrate disk;
  contacting the unburdened first resin material with a reverse second data pattern of a first stamper;
  hardening the first resin material about the reverse second data pattern to form a first intermediate layer including a second data pattern corresponding to the reverse second data pattern of the first stamper;
  applying a second reflective layer over the second data pattern, the second reflective layer being configured to be read from a direction opposite the substrate disk;
  applying a cover layer over the second reflective layer opposite the first intermediate layer, the cover layer having an exposed outer surface opposite the second reflective layer;
  applying an unhardened second resin material to the second reflective layer opposite the first intermediate layer;
  contacting the unhardened second resin material with a reverse third data pattern of a second stamper;
  hardening the second resin material about the reverse third data pattern to form a second intermediate layer including a third data pattern corresponding to the reverse third data pattern of the second stamper; and
  applying a third reflective layer over the third data pattern, the third reflective layer being configured to be read from the direction opposite the substrate disk, wherein
  the cover layer is formed over the third reflective layer opposite the second intermediate layer and has an exposed outer surface opposite the third reflective layer.

14. The method of claim 13, wherein the substrate disk has a thickness within a range of about 1.1 mm to 1.3 mm, the first intermediate layer has a thickness of about 20 μm, the second intermediate layer has a thickness within a range of 20 μm to 30 μm and the cover layer has a thickness within a range of 72 μm to 78 μm.

* * * * *

UNITED STATES PATENT AND TRADEMARK OFFICE
CERTIFICATE OF CORRECTION

Page 1 of 1

PATENT NO. : 8,675,464 B2
APPLICATION NO. : 12/896344
DATED : March 18, 2014
INVENTOR(S) : William R. Mueller and Ed Pickutoski It is certified that error appears in the above-identified patent and that said Letters Patent is hereby corrected as shown below:

Replace the related U.S. application data on the Title page of the patent, with the following:

(63) Continuation-in-part of application No. 12/696,878, filed on Jan. 29, 2010, now Pat. No. 7,986,601, which is a continuation of application No. 11/284,687, filed on Nov. 22, 2005, now Pat. No. 7,684,309. Continuation-in-part of application No. 11/726,968, filed on Mar. 22, 2007, now Pat. No. 7,986,611.

(60) Provisional Application No. 60/733,598, filed November 3, 2005, Provisional Application No. 61/249,949, filed October 8, 2009.

Signed and Sealed this
Twenty-second Day of July, 2014

Michelle K. Lee
*Deputy Director of the United States Patent and Trademark Office*